Feb. 21, 1933.    J. T. HUGHES    1,898,836
TRIPLE CONTROL MEANS FOR LANDING GEAR WHEEL BRAKES OF AIRPLANES
Filed July 22, 1930    2 Sheets-Sheet 2
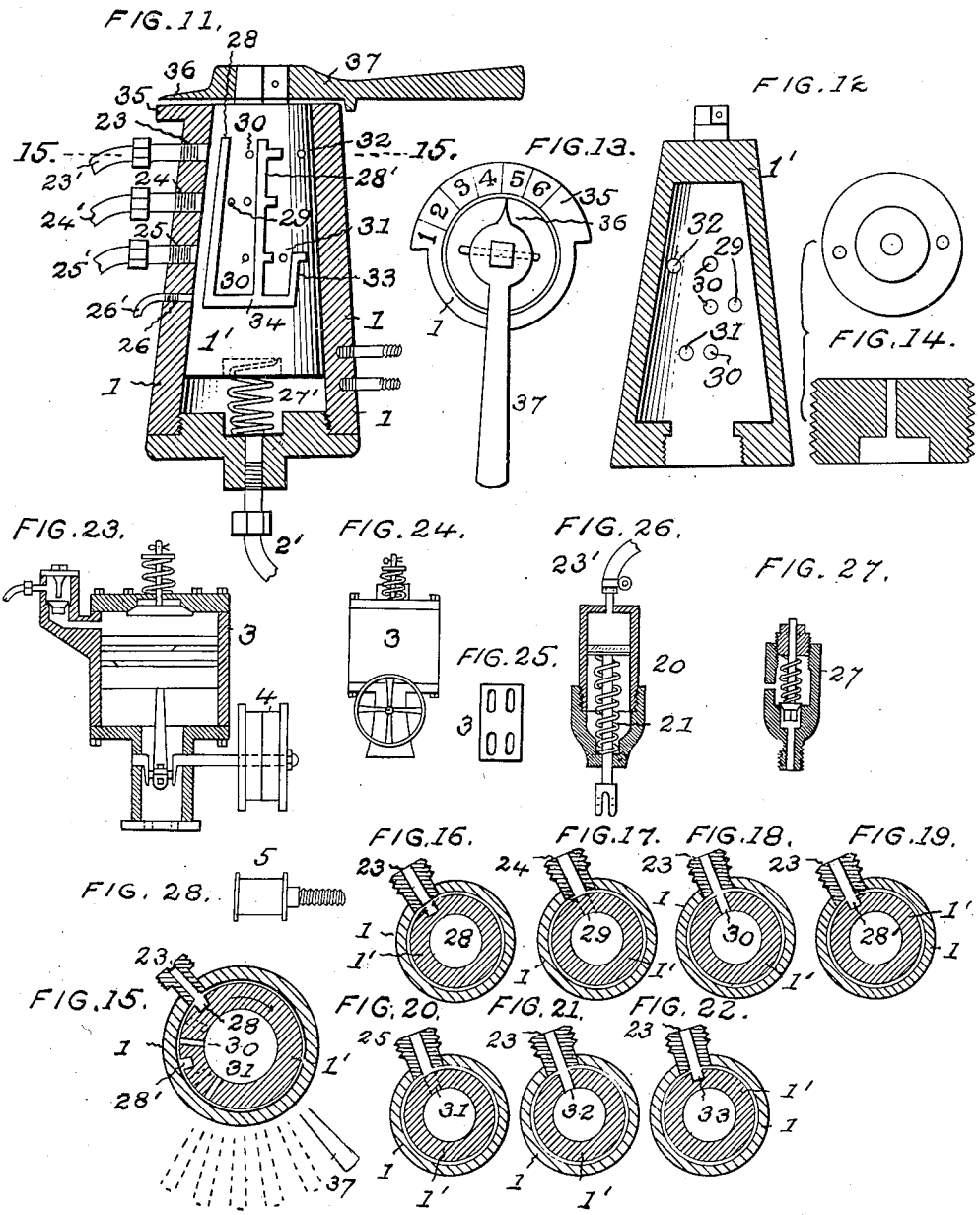
INVENTOR:
JOHN T. HUGHES,
BY
Robert Benne
ATTORNEY.

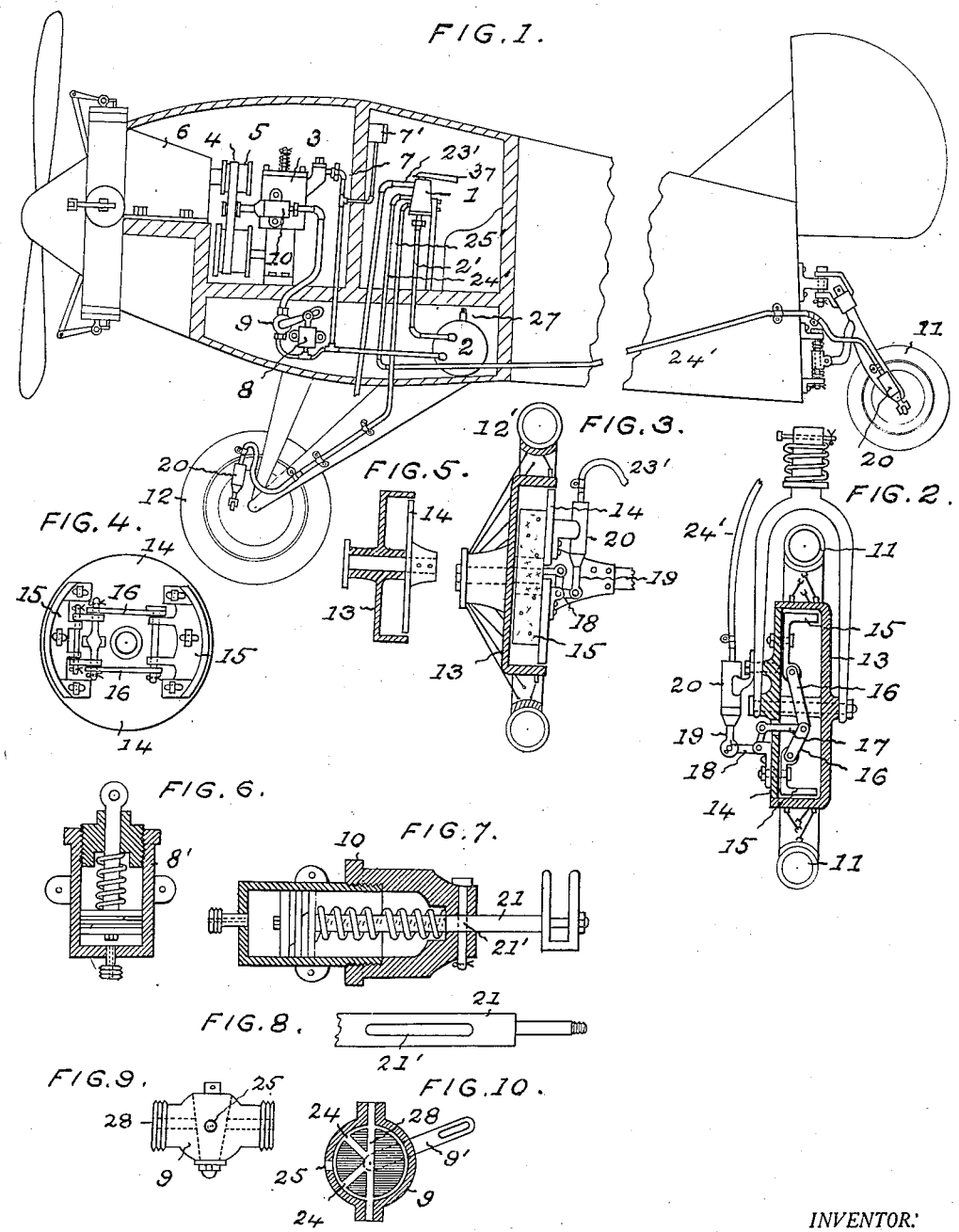
Feb. 21, 1933. J. T. HUGHES 1,898,836
TRIPLE CONTROL MEANS FOR LANDING GEAR WHEEL BRAKES OF AIRPLANES
Filed July 22, 1930 2 Sheets-Sheet 1
INVENTOR:
JOHN T. HUGHES,
BY
Robert Burns,
ATTORNEY.

Patented Feb. 21, 1933

1,898,836

UNITED STATES PATENT OFFICE

JOHN T. HUGHES, OF CHICAGO, ILLINOIS

TRIPLE CONTROL MEANS FOR LANDING GEAR WHEEL BRAKES OF AIRPLANES

Application filed July 22, 1930. Serial No. 469,738.

This invention relates to a triple control means for the rear and the pair of front ground wheel pneumatic brakes of the landing gear of air planes and has for its object:—

To provide a structural formation and combination of parts and features in an air brake, a controlling valve mechanism for the landing gear of air planes, by means of which a braking action may be applied to any ground wheels of the landing gear, and wherein in the adjustment of the movable member of the valve, any one ground wheel of the air plane landing gear can be individually set; or two or more of said ground wheels simultaneously set, or the entire set of ground wheels simultaneously set, in a ready and effective manner by a rapid shift of said movable valve member by the pilot of the air plane. All as will hereinafter more fully appear.

In the accompanying drawings:

Fig. 1 is a side elevation of an air plane, with parts broken away and in section, illustrating the preferred general arrangement of parts in this invention.

Fig. 2 is a transverse sectional elevation of the rear ground wheel and its braking mechanism.

Fig. 3 is a similar view of one of the counterpart front ground wheels and their braking mechanisms.

Fig. 4 is an elevation of a movable unit of the brake mechanism.

Fig. 5 is a detail axial section of the brake drum of a front ground wheel of this improvement.

Fig. 6 is a detail sectional elevation of the pressure regulating valve used in connection with air reservoir.

Fig. 7 is a detail sectional elevation of the motor cylinder and connections of the belt shifting mechanism of the air compressor of the system.

Fig. 8 is a detail side view of the piston rod of the aforesaid belt shifting motor cylinder.

Fig. 9 is a detail side view of the pressure controlling valve of the pressure reservoir.

Fig. 10 is a detail vertical section of the same.

Fig. 11 is a view showing the housing of the main controlling valve in section and with the movable member of the valve in elevation.

Fig. 12 is a detail axial section of the aforesaid movable valve member.

Fig. 13 is a detail top view of the main controlling valve, showing its operating handle and associated index dial.

Fig. 14 is an enlarged detail bottom view and central section of the bottom bushing of the movable valve member of the main controlling valve.

Fig. 15 is a detail horizontal section of the main controlling valve, on line 15—15, Fig. 11.

Fig. 16 is a diagrammatic horizontal section showing the movable valve member of the main controlling valve in its primary or normal position, with all the brake cylinders in an exhaust condition.

Fig. 17 is a similar view, showing said movable valve member in position to supply air pressure to the cylinder of the air brake of the rear ground wheel.

Fig. 18 is a similar view, with said movable valve member in position to supply air pressure to the cylinders of the brake mechanisms of all the ground wheels.

Fig. 19 is a similar view, with said movable valve member with its secondary release passage in communication with all the brake cylinders of the system.

Fig. 20 is a similar view, with said movable valve member in position to supply air pressure to the cylinder of the air brake mechanism of the left hand front ground wheel.

Fig. 21 is a like view, with the valve member in position to supply air pressure to the right hand front ground wheel.

Fig. 22 is a similar view, with the movable valve member in a position to release the pressure in the cylinder of the brake mechanism of the right front ground wheel, while pressure is being supplied to the brake cylinder of the right front ground wheel braking mechanism;

Fig. 23 is a central vertical section of the air pump of the system.

Fig. 24 is a side elevation of the same.

Fig. 25 is a bottom plan of the base of the air pump.

Fig. 26 is a detail central section of a motor cylinder and piston of the series of brake operating mechanisms of the system.

Fig. 27 is an axial section of the safety valve of the air reservoir.

Fig. 28 is a detail side view of the driving pulley of the main engine of the air plane for driving the air pump of the system.

Like reference numerals indicate like parts in the several views.

In a "take-off maneuver" of an airplane from the ground, an essential requirement is that the plane be maneuvered into a favorable wind direction, in the attainment of which the front wheel brakes of the landing gear are used. And in making a turn to the left the left front wheel brake will be used while in making a turn to the right the right front wheel brake will be used. In effecting the above mentioned "take-off maneuvers" with the earlier hand and foot operated front wheel brakes, laborious effort on the part of the pilot was required, in that in the hand operated braking mechanisms, the pilot's attention as well as the use of one hand was required for a time in effecting a backward pull on the mechanism, and in the larger type of airplanes having two brake levers, one for each front wheel brake, two pilots were found desirable in operating both front wheels simultaneously.

An added disadvantage in such older type of braking mechanism was a liability in the plane to "nose over" and crash when the brakes were not operated with evenly applied pressure.

As distinguished from such older and laboriously functioning brake mechanisms, this improvement involves a construction and correlation of elements by means of which a rapid and effective operation of the brakes of the series of three ground wheels of an airplane, either singly or simultaneously, is attained with a minimum of effort or attention on the part of the pilot in a "take off" operation.

In the preferred construction and arrangement of parts and features of the invention illustrated in Fig. 1, the hereinafter described main controlling valve has its stationary member or housing 1 fixedly mounted within convenient reach of the air plane pilot.

Associated with said main controlling valve, is a compressed air reservoir 2, and from which the compressed air is supplied to said valve for controllable distribution in manner hereinafter described to the braking mechanisms of the ground wheels of the airplane.

In the construction shown, pressure of air at a predetermined pressure is maintained in the reservoir 2 by an air pump 3 that has driven connection by belt and pulley or other like connection 4 with a pulley 5 or the like, associated with a shaft of the propelling motor 6 of the air plane.

In the construction shown, the pipe connection 7 between the air pump 3 and reservoir 2 is provided with a branch connection with a pressure gage 7' arranged for convenient viewing by the pilot. Said pipe connection 7 also has supply connection with a pressure actuated unit 8 which is in operative connection with the movable member of the hereinafter described relief valve 9 in a supply pipe extending from the reservoir 2 to the motor cylinder 10, of the belt shifting mechanism of the driving means of the air pump 3 above referred to. In the construction shown in Fig. 1, the piston of the motor cylinder 10 has operative engagement with the endless belt of the driving connection 4 of the air pump 3, to shift said belt to and from the usual driven and loose pulleys of the shaft of said air pump. The scope of this part of the invention embraces the use of any of the ordinary forms of a automatic regulating means whereby a constant and uniform pressure is maintained in a storage reservoir.

This invention is intended for use in connection with that type of airplane landing gear having a single rear ground wheel 11 and right and left ground wheels 12, 12', are mounted in the usual manner on the fuselage of the airplane.

In detail each ground wheel is provided with a closed cup shaped brake shell 13 secured as a fixture on the wheel with its circular interior adapted to contain the movable member of the braking means, with such movable member comprising parts as follows:

A head or disk 14, secured to a non-revoluble wheel carrying frame or the like non-revoluble axle of the ground wheel, forms a closure for the open side of the aforesaid brake shell or member 13 and provides a support for a plurality of radially movable brake shoes 15, slidingly mounted on said head or disk 14 as illustrated in Figs. 2, 3, 4 and 5.

At their inner ends the brake shoes 15 have pivotal connections with the outer ends of a pair of toggle links 16, which links at their inner ends are pivotally connected to one end of an operating rod 17, the other end of which is pivotally connected to one arm of a bell crank lever 18. The other arm of said bell crank lever has operative connection with the piston rod 19 of a motor cylinder 20 that is mounted on the non-revoluble closure head 14 aforesaid.

Each motor cylinder 20 just referred to, and as shown in Fig. 26, is of the single acting type, in which its piston is positively forced in one direction by air pressure introduced by a pipe connection 23' extending to the hereinafter described main controlling valve of the system. The return movement of the piston of said motor cylinder 20 is effected, in the absence of pressure on said cylinder by a spring 20', acting in opposition to the action of air pressure on the piston.

The motor cylinder 10, of the belt shifting means of the driving mechanism of the air pump 3 of the system, is also of the single acting type above described, and carries additional means as follows:

A cross pin passing through an end of said motor cylinder 10, and having engagement in an elongated slot 21' in the piston rod 21 of the cylinder to prevent independent turning movement of the piston rod and piston associated therewith, as illustrated in Figs. 7 and 8.

The motor cylinder 8' of the pressure governed unit 8 of the controlling valve 9 of the aforesaid motor cylinder 10 of the driving mechanism of the air pump 3, and as shown in Fig. 6 is of the same single acting type as that above described in connection with the other motor cylinders.

The pressure controlling valve 9 is preferably of the semi-rotary plug type, shown in Figs. 9 and 10, with the arm 9' of its movable plug member operatively connected to the piston of the motor cylinder 8' of the pressure governing unit above described. In the construction shown, said plug is formed with a diametric passage 23 adapted to supply pressure to the aforesaid motor cylinder 8', and with a pair of radial passages 24 adapted to connect said cylinder with an exhaust or outlet passage 25 in the stationary housing or member of the valve.

The storage reservoir 2 is provided with a safety valve 27 preferably of the spring type shown in Fig. 27, and where independent movement between parts of any air pipe connection of the system takes place, such movement will be provided for by flexible hose, or like insertions, between the respective parts.

The construction and arrangement of parts so far described are intended to set forth a suitable system of braking mechanisms for airplanes in which this invention may form a component part.

The main controlling valve 1 of the system is preferably of the ordinary semi-rotary tapering plug type shown in Figs. 11 to 14 inclusive, with the stationary housing or shell 1 thereof formed with a series of ports or orifices 23, 24, 25 and 26, in spaced and aligned relation along the length of the housing, and having individual pipe connections 23', 24', and 25' with the respective motor cylinders of the heretofore described brake mechanisms of the ground wheels of the landing gear of the system, and in manner as follows:—

The aforesaid port or orifice 23, by pipe connection 23' with the brake cylinder of the brake mechanism of the right hand front ground wheel of the system; the aforesaid port or orifice 24, by pipe connection 24' with the brake cylinder of the brake mechanism of the rear ground wheel of the system; the port or orifice 25, by pipe connection 25' with the brake cylinder of the brake mechanism of the left hand front wheel of the system, and the port or orifice 26, with a pipe connection extending to a suitable discharge.

In the particular construction of the valve shown in Figs. 11 and 12, the movable member or plug 1' of the valve, is of a chambered form with an opening or passage in its lower end, so that the compressed air passing into the stationary valve housing 1 by pipe connection 2' may pass into the chamber of the movable valve member 1'. In such construction close yielding contact between the two members of the valve is attained by an interposed spring 27' as shown in Fig. 11.

The movable valve member 1' in such construction, is formed with a main longitudinal groove or passage 28 in its perimeter, adapted in its normal position, as indicated in Fig. 16, to register with the series of ports 23, 24, 25 and 26 of the stationary valve member, so as to place the different motor cylinders of the ground wheel brake mechanisms, all in a condition of exhaust.

Next adjacent to the above mentioned longitudinal groove or passage 28, an orifice or passage 29 is formed in the wall of the said movable valve member, adapted for individual register with port or passage 24 of the stationary valve member, as illustrated in Fig. 17, and by pipe connection 24 with the motor cylinder 20 of the brake mechanism of the rear ground wheel of the system, introduce pressure into such cylinder and effect a braking operation on said rear ground wheel, independent of any braking action on the two front ground wheels of the system.

Next adjacent to the orfice or passage 29, above described, a series of three orifices or passages 30 are formed in the wall of said movable valve member in longitudinal aligned relation to each other and in transverse aligned relation with the ports or passages 23, 24 and 25 of the stationary valve member, so that when the same are in register as illustrated in Fig. 18, air pressure will be admitted to the motor cylinders of the brake mechanisms of both the front and rear ground wheels of the system.

Next adjacent to the series of orifices or passages 30, above described, a secondary longitudinal groove or passage 28' is formed in the perimeter of said movable valve member, the purpose of which is to provide at a certain position of adjustment of the movable valve member for a more rapid registration of the series of ports 23, 24 and 25 of the stationary valve member with the exhaust port or passage 26 of the same, as illustrated in Fig. 19, to place all the motor cylinders of the ground wheel brake mechanisms in a condition of exhaust, similar to that heretofore described in connection with the groove or passage 28 in the perimeter of the movable valve member.

Next adjacent to the longitudinal passage 28' just described, an orifice or passage 31 is formed in the wall of the movable valve member, for individual register, as illustrated in Fig. 20, with the port or passage 25 of the stationary valve member in communication by pipe connection 25' with the motor cylinder of the brake mechanism of left hand front ground wheel of the system, and adapted to effect an individual action of said mechanism, independent of the mechanisms of the other ground wheels.

Next adjacent to the orifice or passage 31, just described, an orifice or passage 32 is formed in the wall of the movable valve member, and adapted for individual register, as illustrated in Fig. 21, with the port or passage 23, that is in communication by pipe connection 23' with the motor cylinder of the brake mechanism of the right hand front ground wheel of the system, and are adapted to effect an individual action of said mechanism independent of the mechanisms of the other ground wheels.

Intermediate of the orifices or passages 31 and 32 just described, an auxiliary passage 33 is formed in the perimeter of said movable valve member, and adapted in its shift over the aforesaid orifice or passage 31, to register the same with the exhaust port or passage 26 of the stationary valve member, to free the motor cylinder of the left hand front ground wheel brake mechanism of any air pressure that may remain in the same, and with a view to attain a more effective operation of the brake mechanism of the companion right hand front ground wheel of the system.

In the described arrangement of the aforesaid passages 28, 28' and 33, in the perimeter of the movable valve member, the same are connected together by a circumferential passage 34 having aligned relation to the exhaust port or passage 26 of the stationary valve member.

The stationary member or housing 1 of the main controlling valve carries a fixed index dial 35, marked with points 1 to 6 inclusive, and in connection with said dial a pointer 36 is carried on the movable member 1' of the valve, and preferably as a part of the operating handle 37 thereof, with said parts adapted to function or indicate as follows:—

With the pointer 36 at point 1, all the brakes are in a release or exhaust condition; with the pointer 36 at point 2, the rear ground wheel brake mechanism is in active operation; with the pointer 36 at point 3, the brake mechanism of the entire set of ground wheels are in active operation; with the pointer 36 at point 4, the brake mechanisms of all the ground wheels are in a condition of release or exhaust; with the pointer 36 at the point 5, the brake mechanism of the left hand front wheel is in active operation, and with the pointer 36 at the point 6, the brake mechanism of the right hand front ground wheel is in active operation.

It is within the scope of this invention to substitute for the semi-rotary plug type of the main controlling valve, a valve structure of the ordinary flat slide valve type or the ordinary semi-rotary disk type valve, with the ports and passages of either type arranged to correspond with an unfolded arrangement and relation of said ports and passages herein described in detail, in the contact surfaces of the stationary and movable members of such different types of valves.

Having thus fully described my invention what I claim and desire to secure by Letters Patent, is:—

1. In a triple control means for the air brake system of the landing gear of airplanes having a rear ground wheel and right and left front ground wheels, said means comprising a stationary valve member having inlet-outlet passages adapted for individual connection with the brake mechanisms of the ground wheels of a landing gear and with an exhaust passage, and an adjustable valve member associated with the stationary valve member and formed with a passage in its contact face adapted for simultaneous registry with the inlet-outlet passages and exhaust passage of the stationary valve member, with a series of inlet passages in lateral relation to the aforesaid passage in its contact face and adapted for simultaneous registry with the series of inlet-outlet passages of the stationary valve member, with an inlet passage in lateral relation to said series of inlet passages and adapted for individual registry with a passage in the stationary valve member that is adapted for communication with one of the front wheel brake mechanisms, and an inlet passage in lateral relation to the last mentioned inlet passage and adapted for individual registry with a passage in the stationary valve member that is adapted for communication with the brake mechanism of the other front wheel.

2. In a triple control means for the air brake system of the landing gear of airplanes having a rear ground wheel and right and left front ground wheels, said means comprising a stationary valve member having inlet-outlet passages adapted for individual connection with the brake mechanisms of said wheels and with an exhaust passage, and an adjustable valve member associated with the stationary valve member and formed with a passage in its contact face adapted for simultaneous registry with the inlet-outlet passages and exhaust passage of the stationary valve member, with a series of inlet passages in lateral relation to the aforesaid passage in its contact face and adapted for simultaneous registry with the series of inlet-outlet passages of the stationary valve member, with a secondary passage in its contact face in lateral relation to said series of inlet passages and adapted for simultaneous registry with the inlet-outlet passages and exhaust passage of the stationary valve member, with an inlet passage in lateral relation to said secondary passage and adapted for individual registry with a passage in the stationary valve member that is adapted for communication with one of the front wheel brake mechanisms, and an inlet passage in lateral relation to the last mentioned inlet passage and adapted for individual registry with a passage in the stationary valve member that is adapted for communication with the brake mechanism of the other front wheel.

3. In a triple control means for the air brake system of the landing gear of airplanes having a rear ground wheel and right and left front ground wheels, said means comprising a stationary valve member having inlet-outlet passages adapted for individual connection with the brake mechanisms of said wheels and with an exhaust passage, and an adjustable valve member associated with the stationary valve member and formed with a passage in its contact face adapted for simultaneous registry with the inlet-outlet passages and exhaust passage of the stationary valve member, with an inlet passage in lateral relation to the aforesaid passage in its contact face and adapted for individual registry with a passage in the stationary valve member that is adapted for communication with the rear ground wheel brake mechanism, with a series of inlet passages in lateral relation to said inlet passage and adapted for simultaneous registry with the series of inlet-outlet passages of the stationary valve member, with an inlet passage in lateral relation to said series of inlet passages and adapted for individual registry with a passage in the stationary valve member that is adapted for communication with one of the front wheel brake mechanisms, and with an inlet passage in lateral relation to the last mentioned inlet passage and adapted for individual registry with a passage in the stationary valve member that is adapted for communication with the brake mechanism of the other front wheel.

4. In a triple control means for the air brake system of the landing gear of airplanes having a rear ground wheel and right and left front ground wheels, said means comprising a stationary valve member having inlet-outlet passages adapted for individual connection with the brake mechanisms and with an exhaust passage, and adjustable valve member associated with the stationary valve member and formed with a passage in its contact face adapted for simultaneous registry with the inlet-outlet passages and exhaust passage of the stationary valve member, with an inlet passage in lateral relation to the aforesaid passage in its contact face and adapted for individual registry with a passage in the stationary valve member that is adapted for communication with the rear ground wheel brake mechanism, with a series of inlet passages in lateral relation to said inlet passage and adapted for simultaneous registry with the series of inlet-outlet passages of the stationary valve member, with a secondary passage in its contact face in lateral relation to said series of inlet passages and adapted for simultaneous registry with the inlet-outlet passages and exhaust passage of the stationary valve member, with an inlet passage in lateral relation to said secondary passage and adapted for individual registry with a passage in the stationary valve member that is adapted for communication with one of the front wheel brake mechanisms, and an inlet passage in lateral relation to the last mentioned inlet passage and adapted for individual registry with a passage in the stationary valve member that is adapted for communication with the brake mechanism of the other front wheel.

5. In a triple control means for the air brake system of the landing gear of airplanes having a rear ground wheel and right and left front ground wheels, said means comprising a stationary valve member having inlet-outlet passages adapted for individual connection with the brake mechanisms of said wheels and with an exhaust passage and an adjustable valve member associated with the stationary valve member and formed with a passage in its contact face adapted for simultaneous registry with the inlet-outlet passages and exhaust passage of the stationary valve member, with an inlet passage in lateral relation to the aforesaid passage in its contact face and adapted for individual registry with a passage in the stationary valve member that is adapted for communication with the rear ground wheel brake mechanism, with a series of inlet passages in lateral relation to said inlet passage and adapted for simultaneous registry with the series of inlet-outlet passages of the stationary valve member, with an inlet passage in lateral relation to said series of inlet passages and adapted for individual registry with a passage in the stationary valve member that is adapted for communication with one of the front wheel brake mechanisms, with an inlet passage in lateral relation to the last mentioned inlet passage and adapted for individual registry with a passage in the stationary valve member that is adapted for communication with the brake mechanism of the other front wheel, and with an auxiliary passage in its contact face in lateral relation to the last mentioned inlet passage and having branch connection adapted to register with the exhaust passage of the stationary valve member.

6. In a triple control means for the air brake system of the landing gear of airplanes having a rear ground wheel and right and left hand front ground wheels, said means comprising a stationary valve member having inlet-outlet passages adapted for individual connection with the brake mechanisms of said wheels and with an exhaust passage, and a revoluble valve member having an inner chamber adapted for connection with the source of pressure supply and formed with a passage in its contact face adapted for simultaneous registry with the inlet-outlet passages and exhaust passage of the stationary valve member, with a series of inlet passages in lateral relation to the said passage in its contact face and adapted for simultaneous registry with the series of inlet-outlet passages of the stationary valve member, with an inlet passage in lateral relation to said series of inlet passages and adapted for individual registry with a passage in the stationary valve member that is adapted for communication with one of the front wheel brake mechanisms, and an inlet passage in lateral relation to the last mentioned inlet passage and adapted for individual registry with a passage in the stationary valve member that is adapted for communication with the brake mechanism of the other front wheel.

7. In a triple control means for the air brake system of the landing gear of airplanes having a rear ground wheel and right and left hand front ground wheels, said means comprising a stationary valve member having inlet-outlet passages adapted for individual connection with the brake mechanisms of said wheels and with an exhaust passage, and a revoluble valve member having an inner chamber adapted for connection with the source of pressure supply and formed with a passage in its contact face adapted for simultaneous registry with the inlet-outlet passages and exhaust passage of the stationary valve member, with a series of inlet passages in lateral relation to the said passage in its contact face and adapted for simultaneous registry with the series of inlet-outlet passages of the stationary valve member, with a secondary passage in its contact face in lateral relation to said series of inlet passages and adapted for simultaneous registry with the inlet-outlet passages and exhaust passage of the stationary valve member, with an inlet passage in lateral relation to said series of inlet passages and adapted for individual registry with a passage in the stationary valve member that is adapted for communication with one of the front wheel brake mechanisms, and an inlet passage in lateral relation to the last mentioned inlet passage and adapted for individual registry with a passage in the stationary valve member that is adapted for communication with the brake mechanism of the other front wheel.

8. In a triple control means for the air brake system of the landing gear of airplanes having a rear ground wheel and right and left hand front ground wheels, said means comprising a stationary valve member having inlet-outlet passages adapted for individual connection with the brake mechanisms of said wheels and with an exhaust passage, and a revoluble valve member having an inner chamber adapted for connection with the source of pressure supply and formed with a passage in its contact face adapted for simultaneous registry with the inlet-outlet passages and exhaust passage of the stationary valve member, with an inlet passage in lateral relation to the aforesaid passage in its contact face and adapted for individual registry with a passage in the stationary valve member that is adapted for communication with the rear ground wheel brake mechanism, with a series of inlet passages in lateral relation to said inlet passage and adapted for simultaneous registry with the series of inlet-outlet passages of the stationary valve member, with an inlet passage in lateral relation to said series of inlet passages and adapted for individual registry with a passage in the stationary valve member that is adapted for communication with one of the front wheel brake mechanisms, and with an inlet passage in lateral relation to the last mentioned inlet passage and adapted for individual registry with a passage in the stationary valve member that is adapted for communication with the brake mechanism of the other front wheel.

9. In a triple control means for the air brake system of the landing gear of airplanes having a rear ground wheel and right and left hand front ground wheels, said means comprising a stationary valve member having inlet-outlet passages adapted for individual connection with the brake mechanisms of said wheels and with an exhaust passage, and a revoluble valve member having an inner chamber adapted for connection with the source of pressure supply and formed with a passage in its contact face adapted for simultaneous registry with the inlet-outlet passages and exhaust passage of the stationary valve member, with an inlet passage in lateral relation to the aforesaid passage in its contact face and adapted for individual registry with a passage in the stationary valve member that is adapted for communication with the rear ground wheel brake mechanism, with a series of inlet passages in lateral relation to said inlet passage and adapted for simultaneous registry with the series of inlet-outlet passages of the stationary valve member, with a secondary passage in its contact face in lateral relation to said series of inlet passages and adapted for simultaneous registry with the inlet-outlet passages and exhaust passage of the stationary valve member, with an inlet passage in lateral relation to said secondary passage and adapted for individual registry with a passage in the stationary valve member that is adapted for communication with one of the front wheel brake mechanisms, and an inlet passage in lateral relation to the last mentioned inlet passage and adapted for individual registry with a passage in the stationary valve member that is adapted for communication with the brake mechanism of the other front wheel.

In testimony whereof I hereunto affix my signature.

JOHN T. HUGHES.